United States Patent
Roh et al.

(10) Patent No.: US 7,336,577 B2
(45) Date of Patent: Feb. 26, 2008

(54) APPARATUS AND METHOD FOR COMPENSATING WOBBLE IN HOLOGRAPHIC DIGITAL DATA STORAGE SYSTEM

(75) Inventors: Jae-Woo Roh, Seoul (KR); Jang-Hyun Cho, Seoul (KR)

(73) Assignee: Daewoo Electronics Corporation (KR)

( * ) Notice: Subject to any disclaimer, the term of this patent is extended or adjusted under 35 U.S.C. 154(b) by 13 days.

(21) Appl. No.: 11/506,122

(22) Filed: Aug. 17, 2006

(65) Prior Publication Data

US 2006/0274630 A1    Dec. 7, 2006

(51) Int. Cl.
*G11B 7/00* (2006.01)
(52) U.S. Cl. .................... 369/53.19; 369/103
(58) Field of Classification Search .............. None
See application file for complete search history.

(56) References Cited

U.S. PATENT DOCUMENTS 5,798,851 A * 8/1998 Tachihara et al. ............ 359/18
5,982,513 A * 11/1999 Zhou et al. .................. 359/22
6,956,681 B2 * 10/2005 Anderson .................... 359/21
2002/0041561 A1 * 4/2002 Tsukamoto et al. ......... 369/103

* cited by examiner

*Primary Examiner*—Wayne Young
*Assistant Examiner*—Lixi Chow
(74) *Attorney, Agent, or Firm*—Anderson Kill & Olick, PC

(57) ABSTRACT

A holographic digital data storage apparatus detects a wobbling in a disc shaped storage medium, wherein the apparatus includes a beam generator and finding means, the disc including therein one or more holographically generated patterns. The beam generator projects at least two wobble detection beams to the holographically generated patterns, the wobble detection beams having different diffraction efficiencies provided at respective characteristic angles, wherein the characteristic angle is an angle between an optical path of one wobble detection beam and that of its corresponding pattern forming beam used in forming one of the holographically generated patterns and a diffraction efficiency is given by a ratio of a power of a diffracted beam of one of the wobble detection beams to a power of said one of the wobble detection beams. The finding means finds at least a difference between the diffraction efficiencies to thereby determine the wobbling in the disc.

8 Claims, 4 Drawing Sheets

APPARATUS AND METHOD FOR COMPENSATING WOBBLE IN HOLOGRAPHIC DIGITAL DATA STORAGE SYSTEM

FIELD OF THE INVENTION

The present invention relates to a holographic digital data storage system; and, more particularly, to an apparatus and method for compensating wobbling which may occur during data reproduction in the holographic digital data storage system.

BACKGROUND OF THE INVENTION

Recently, there have been reported a lot of active researches on holographic digital data storage systems. Results of these researches are now being applied in such a field as a finger print recognition system, as well as any fields that take advantage of a large-scaled storage capability and a high-speed transfer rate.

A conventional holographic digital data storage (HDDS) system stores information on an interference pattern of an object beam and a reference beam in a storage medium, made of, e.g., photo-refractive crystal or photopolymer, which is sensitive to an amplitude of the interference pattern. The storage medium of the HDDS system is often fabricated in a disc shape, the so called "spinner disc" in the form of a CD or a DVD. The HDDS system stores information on an amplitude and a phase of the interference pattern beam by varying an angle of the reference beam. In this way, the spinner disc can store several hundreds or thousands of holograms, each of which is represented by a page in the form of a two dimensional array of binary digits.

When information stored in a storage medium are reproduced, wobbling may be resulted due to a misalignment between the storage medium and its axis of rotation, such that there exists an offset between the normal to the disc plane of the storage medium and the axis of rotation thereof.

Wobbling in certain storage media, e.g., conventional CD and DVD, can be corrected by using servo control of a head or a light pickup with a small mass. Since, however, the holograms are stored on a page-by-page basis in the spinner disc and the optics of the HDDS system is large, the wobbling compensation scheme of the conventional optical disc system cannot be used in the HDDS system.

SUMMARY OF THE INVENTION

It is, therefore, an object of the present invention to provide an apparatus and method for compensating wobbling of a storage medium in a holographic digital data storage system.

In accordance with one aspect of the invention, there is provided a holographic digital data storage apparatus for detecting a wobbling in a disc shaped storage medium, the disc including therein one or more holographically generated patterns, the apparatus including: a beam generator for projecting at least two wobble detection beams to the holographically generated patterns, the wobble detection beams having different diffraction efficiencies provided by respective characteristic angles, wherein each characteristic angle is an angle between an optical path of one wobble detection beam and that of its corresponding pattern forming beam used in forming one of the holographically generated patterns and a diffraction efficiency is given by a ratio of a power of a diffracted beam of one of the wobble detection beams to a power of said one of the wobble detection beams; and means for finding at least a difference between the diffraction efficiencies to thereby determine the wobbling in the disc.

In accordance with another aspect of the invention, there is provided a method for use in a holographic digital data storage system for detecting a wobbling in a disc shaped storage medium, including the steps of: (a) generating one or more holographically generated patterns in the disc through the use of pattern forming beams; (b) projecting at least two wobble detection beams having different diffraction efficiencies provided at respective characteristic angles, wherein each characteristic angle is an angle between an optical path of one wobble detection beam and that of its corresponding pattern forming beam and a diffraction efficiency is given by a ratio of a power of a diffracted beam of one of the wobble detection beams to that of said one of the wobble detection beams; and (c) finding at least a difference between the diffraction efficiencies to thereby detect the wobble in the disc.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
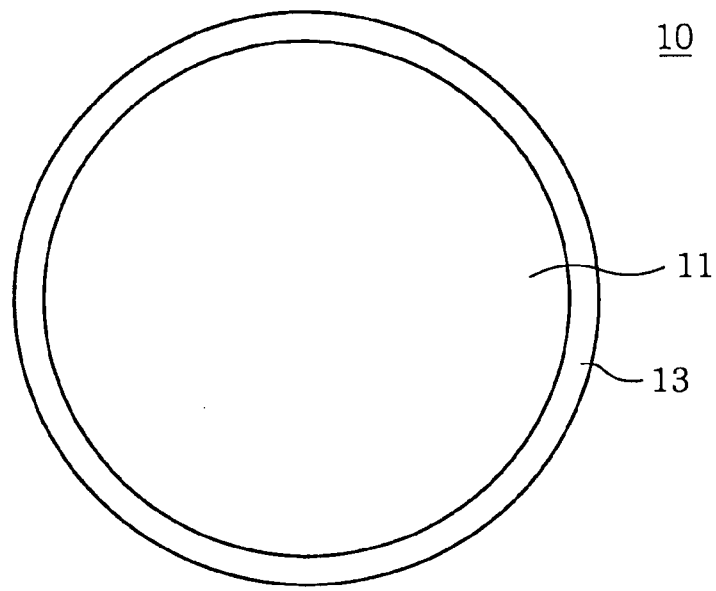
FIG. 1 shows an exemplary format of a storage medium used in a holographic digital data storage (HDDS) system in accordance with the present invention.

FIG. 1 shows an exemplary format of a storage medium 10 for use in a holographic digital data storage (HDDS) system in accordance with the present invention, the storage medium 10 being fabricated in a disc shape. The storage medium 10 (referred to as a "spinner disc" hereinafter) has a data storage section 11 for storing holographic digital data and a wobble tracking section 13 pre-formatted along the circumferential region thereof for detecting wobbling. The wobble detecting schemes in accordance with the present invention will be described hereinbelow.

Figure 2:
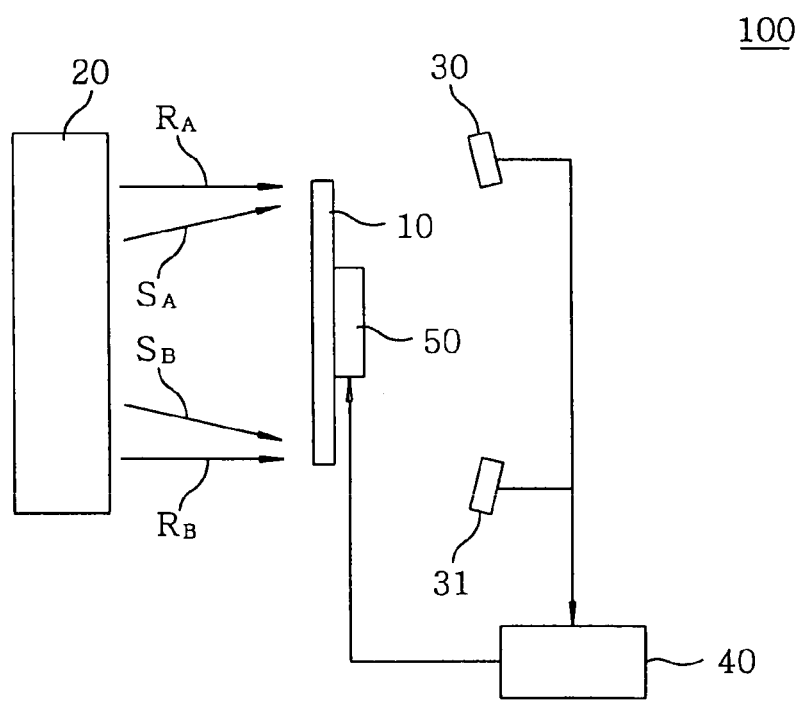
FIG. 2 describes a schematic diagram of an HDDS spinner disc apparatus in accordance with a first preferred embodiment of the present invention.

FIG. 2 describes a schematic diagram of an HDDS spinner disc apparatus 100 capable of generating reference patterns on the spinner disc 10 and compensating wobbling thereof in reproduction based on the reference patterns in accordance with a first preferred embodiment of the present invention. The HDDS spinner disc apparatus 100 includes a beam generator 20, power detectors 30 and 31, a controller 40 and a tilt adjuster 50. Information data storing and reproducing operation in and from the data storage section 11, which is well known in the art, is not germane to the subject matter of the present invention and, therefor, will not be described herein for the sake of simplicity.

The beam generator 20 projects, during the revolution of the spinner disc 10, reference beams $R_A$, $R_B$ and signal beams $S_A$, $S_B$ to two or more positions on a wobble tracking section 13 shown in FIG. 1, to thereby mark two or more reference patterns. The reference pattern generation step is carried out, e.g., during the initial stage of data storing operation, i.e., before beginning to write the information data in the data storage section 11 of the spinner disc 10.

For the convenience of description, it is assumed that two reference beams $R_A$, $R_B$ and two signal beams $S_A$, $S_B$ are used in marking two reference patterns. However, it should be noted that the number of reference patterns and thus those of the reference and the signal beams for the generation thereof could be varied as desired.

Figure 3:
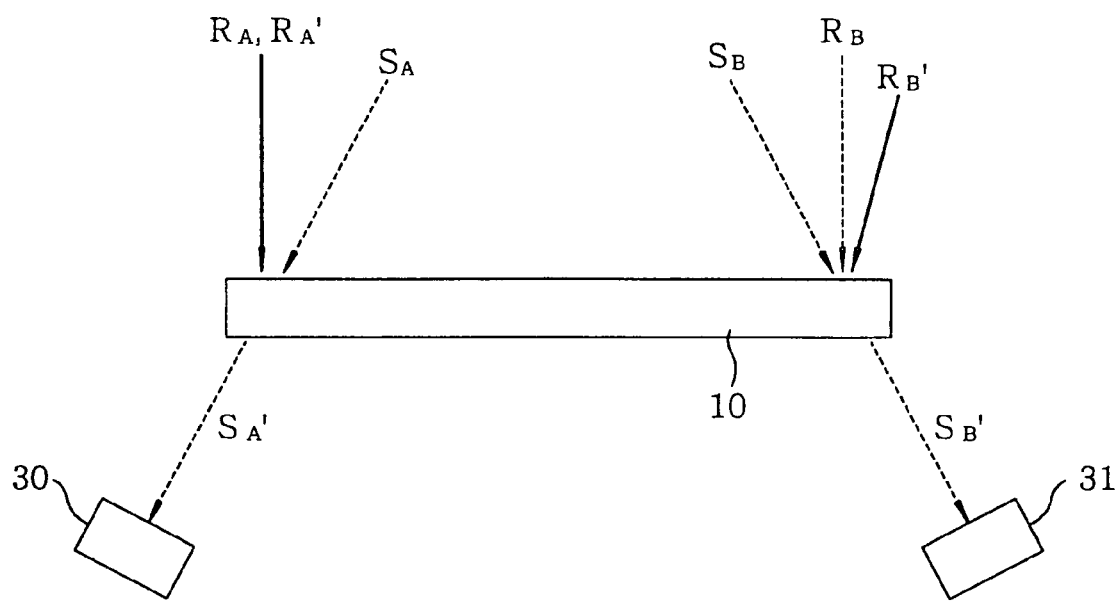
FIG. 3 depicts a schematic view of the HDDS spinner disc apparatus of FIG. 2 for illustrating projection states of wobble detection beams $R_A'$ and $R_B'$.

At the initial stage of reproducing data stored in the spinner disc 10, i.e., before the holographic digital data stored in the data storage section 11 shown in FIG. 1 is reproduced, the beam generator 20 projects, as shown in FIG. 3, wobble detection beams $R_A'$ and $R_B'$ to the wobble tracking section 13 in order to detect and then reduce or remove the wobbling which might have been incurred during the rotation of the spinner disc 10.

One of the wobble detection beams (e.g., $R_A'$) is projected on the spinner disc 10 along an optical path identical to that of one of the reference beams (e.g., $R_A$), while the other wobble detection beam (e.g., $R_B'$) is projected on the spinner disc 10 along an optical path deviated from that of the remaining reference beam (e.g., $R_B$). In other words, the beams $R_A$ and $R_A'$ are basically identical to one another in every aspect (e.g., optical path and beam characteristics including frequency polarity, phase, etc). The wobble detection beam $R_B'$ is also basically identical to the reference beam $R_B$ in terms of the beam characteristics including frequency, phase, etc. The beam intensity of $R_A'$ and $R_B'$ may differ from those of $R_A$ and $R_B$. The beams $R_B$ and $R_B'$ are being aimed at an identical merging point but at difference incident angles.

The power detectors 30 and 31 are installed at bottom side of the spinner disc 10 in paths along which the signal beams $S_A$ and $S_B$ progress, respectively. When the wobble detection beams $R_A'$ and $R_B'$ are projected to the wobble tracking section 13, the power detectors 30 and 31 respectively detect a power $D_A$ of a diffracted beam $S_A'$ of the wobble detection beam $R_A'$ and a power $D_B$ of a diffracted beam $S_B'$ of the wobble detection beam $R_B'$; and provide information on the detected powers $D_A$ and $D_B$ to the controller 40.

The controller 40 compares the detected power levels provided from the power detectors 30 and 31, respectively, to estimate the degree of wobbling of the spinner disc 10 and then controls the tilt adjuster 50 to make the axis of rotation of the spinner disc 10 substantially perpendicular to a writing plane (top surface) thereof, when necessary. (It is assumed that the axis of rotation of the spinner disc 10 is perpendicular to the top surface thereof while writing data thereon.) In detail, if the diffracted power $D_A$ of the wobble detection beam $R_A'$ exceeds a permissible level (i.e., a predetermined threshold value), the controller 40 maintains a current position of the spinner disc 10. (Maximum power levels of $D_A$ and $D_B$ are known to the controller 40.) If otherwise, the controller 40 compares the diffracted power $D_A$ with the diffracted power $D_B$ to determine the size of wobbling of the spinner disc 10 (i.e., the degree of tilt of the spinner disc 10 off the axis of rotation thereof). Subsequently, the controller 40 controls the tilt adjuster 50 to remove or reduce the amount of the wobbling of the spinner disc 10. The wobble compensation process will be described in detail hereinafter.

The tilt adjuster 50 changes the current position of the spinner disc 10 under a control of the controller 40.

Figure 4:
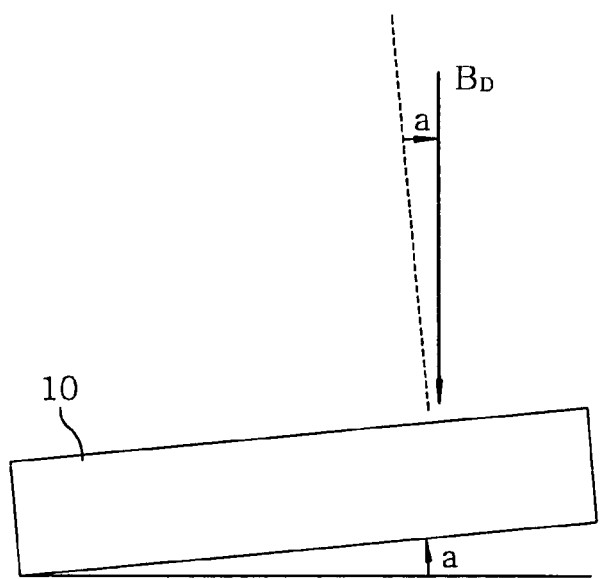
FIG. 4 offers a projection state of a beam in the presence of wobbling of a spinner disc.

FIG. 4 describes a projection state of a beam $B_D$ onto the spinner disc 10. The beam $B_D$ is projected thereto along a single optical path irrespective of a wobble or a normal state of the spinner disc 10. When the spinner disc 10 wobbles by as much as "a" degrees (i.e., the spinner disc 10 has a tilt angle of "a" degrees), an incident angle of the beam $B_D$ upon the tilted spinner disc 10 deviates from that of the beam $B_D$ for the case of the untilted spinner disc 10 by "-a" degrees.

Figure 5:
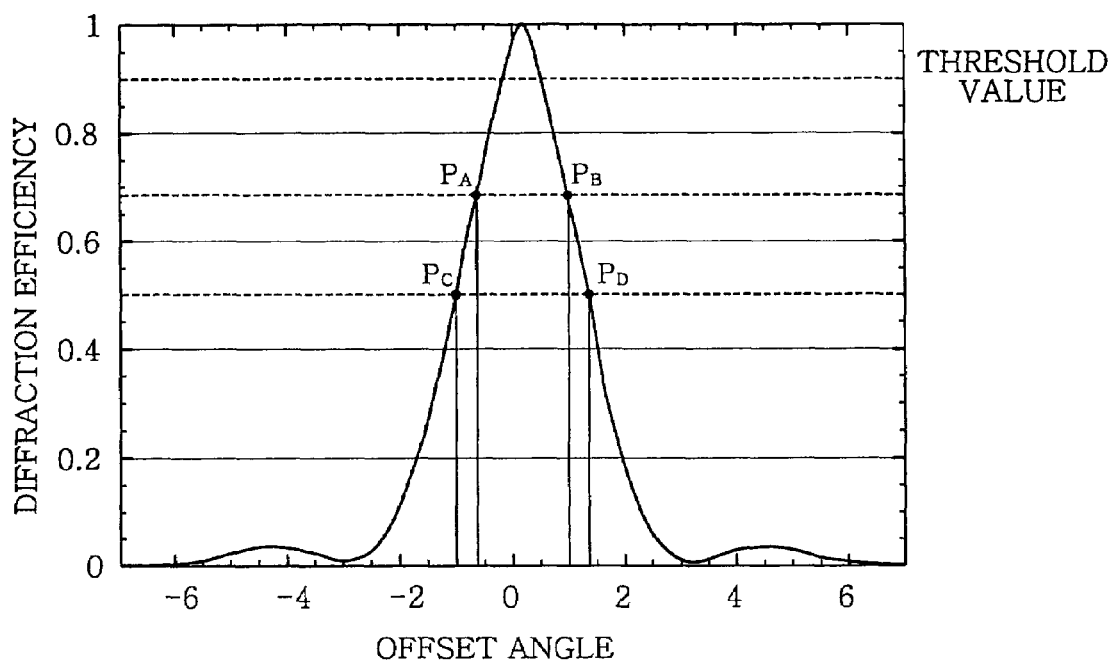
FIG. 5 illustrates a diffraction efficiency as a function of a beam offset angle of a wobble detection beam.

FIG. 5 illustrates exemplary diffraction characteristics as a function of an offset angle of a wobble detection beam. The characteristics can be varied depending on the thickness of the disc and the type of material constituting the disc. The abscissa represents a beam offset angle and the ordinate represents a diffraction efficiency. The diffraction efficiency, which is defined as a ratio of a power $D_A$ (or $D_B$) of a diffracted beam $S_A'$ (or $S_B'$) to that of the wobble detection beam $R_A'$ (or $R_B'$), has a maximum value when the power $D_A$ (or $D_B$) of the diffracted beam $S_A'$ (or $S_B'$) is identical to that of the wobble detection beam $R_A'$ (or $R_B'$).

The beam offset angle is defined as a difference between an ideal incident angle (i.e., an incident angle of the reference beam $R_A$ (or $R_B$) upon the spinner disc 10 while marking the reference patterns) and an actual incident angle (i.e., an incident angle of the wobble detection beam $R_A'$ (or $R_B'$) upon the spinner disc 10).

For example, since the wobble detection beam $R_A'$ is projected on the spinner disc 10 along an optical path identical to that of the reference beam $R_A$ and the wobble detection beam $R_B'$ is projected on the spinner disc 10 along an optical path deviated from that of the reference beam $R_B$ by a predetermined angle (e.g., "θ" degree), beam offset angles of the wobble detection beams $R_A'$ and $R_B'$ are respectively found to be zero degree and "θ" degrees when the spinner disc 10 is in the normal state (i.e., not in the wobble state). If the spinner disc 10 wobbles at a tilt angle of "a" degrees, a beam offset angle of the wobble detection beam $R_A'$ is "-a" degrees and that of the wobble detection beam $R_B'$ is "θ-a" degrees. The deviation angle "θ" is a characteristic angle leading to different diffraction efficiencies of the wobble detection beam $R_A'$ and $R_B'$ and the beam offset angle of the wobble detection beam $R_A'$ and the tilt angle of the spinner disc 10 have a same magnitude but with opposite signs.

If the power $D_A$ of the diffracted beam $S_A'$ exceeds the permissible level, i.e., the diffraction efficiency "α" of the wobble detection beam $R_A'$ is larger than the threshold value, the tilt angle of the spinner disc 10 need not be adjusted; and if otherwise, the tilt angle of the spinner disc 10 must be adjusted until the diffraction efficiency "α" becomes greater than the threshold.

In order to detect the tilt angle of the spinner disc 10, a beam offset should be obtained. As can be seen from the curve in FIG. 5, there exist two beam offset candidate angles corresponding to a given diffraction efficiency except for a case where the diffraction efficiency is at its maximum level. Therefore, it is required to determine which of two candidate angles corresponds to a real beam offset angle of the wobble detection beam $R_A'$ or $R_B'$. The candidate angles are determined from the diffraction characteristic curve shown in FIG. 5 based on diffraction coefficients "α" and "β", which can be defined, as follows:

$$D_A = \alpha I \qquad \text{Eq. (1); and}$$

$$D_B = \beta I \qquad \text{Eq. (2),}$$

wherein diffraction efficiencies "α" and "β" are of the wobble detection beams $R_A'$ and $R_B'$, respectively, and "I" is the power of $R_A'$ and $R_B'$, which is known to the controller 40.

A beam offset angle of the wobble detection beam $R_B'$ is larger than that of the wobble detection beam $R_A'$ by "θ" degrees irrespective whether the spinner disc 10 is in the wobble state or the normal state. In case where "θ" is of a negative value, the beam offset angle of the wobble detection beam $R_B'$ is to be located at a left side of that of the wobble detection beam $R_A'$ on the curve. If "θ" is of a positive value, on the other hand, the beam offset angle of the wobble detection beam $R_B'$ is located at a right side of that of the wobble detection beam $R_A'$ on the curve. By knowing the relative positions of the actual offset angles of the beams $R_A'$ and $R_B'$ and the magnitude of "θ", one can determine the actual offset angles.

For instance, when "θ" is set to be −0.3 degrees and the diffraction efficiencies "α" and "β" are respectively calculated to be 0.7 and 0.5, "α" corresponds to one of two points $P_A$, $P_B$ and "β" corresponds to one of two points $P_C$, $P_D$ on the curve, as shown in FIG. 5. Since "θ" is of a negative value, an actual offset angle of $R_B'$ is to be located at a left side of that of $R_A'$. Accordingly, an angle corresponding to point $P_C$ is determined as the beam offset angle of the wobble detection beam $R_B'$ and an angle corresponding to point $P_A$, which is larger than that of $P_C$ by "θ" degrees (i.e., 0.3 degrees), is determined as the actual beam offset angle of the wobble detection beam $R_A'$. In this case, the offset angle of $R_A'$ is about "−0.6" and, therefore, the tilt angle of the spinner disc 10 is determined to be "+0.6".

Once the tilt angle is determined, the controller 40 controls the tilt adjuster 50 to reduce the tilt angle until the diffraction efficiency "α" of the wobble detection beam $R_A'$ becomes smaller than the threshold value.

It was assumed that the wobble detection beams $R_A'$ and $R_B'$ had a same power "I" in the first preferred embodiment for the sake of simplicity. However, they may have different powers as long as the powers thereof are known to the controller 40.

Figure 6:
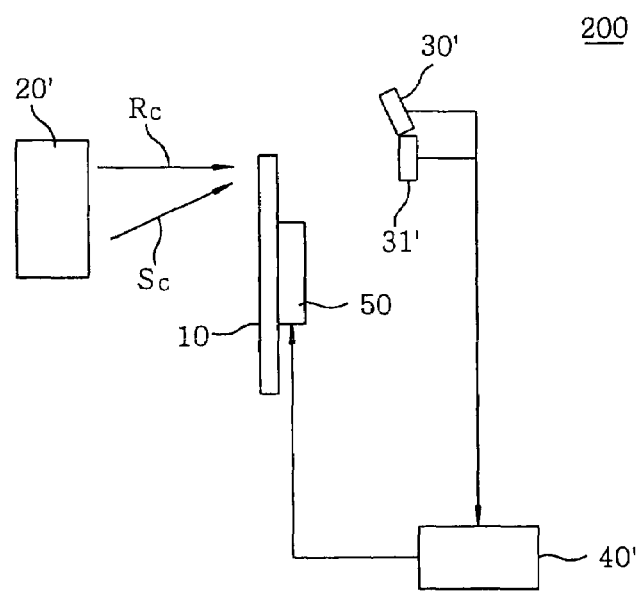
FIG. 6 describes a schematic diagram of an HDDS spinner disc apparatus in accordance with a second preferred embodiment of the present invention.

FIG. 6 describes a schematic diagram of an HDDS spinner disc apparatus 200 capable of generating reference patterns on the spinner disc 10 and compensating wobbling thereof in the reproduction based on the reference patterns in accordance with a second preferred embodiment of the present invention. The HDDS spinner disc apparatus 200 includes a beam generator 20', power detectors 30' and 31', a controller 40' and a tilt adjuster 50. Information data storing and reproducing operation in and from the data storage section 11, will not be described herein for the sake of simplicity.

The beam generator 20' projects, during the revolution of the spinner disc 10, a reference beam $R_C$ and a signal beam $S_C$ to one position on the wobble tracking section 13 shown in FIG. 1, to thereby mark a reference pattern. The reference pattern generation step is carried out, e.g., during the initial stage of data storing operation, i.e., before beginning to write the information data in the data storage section 11 of the spinner disc 10.

Figure 7:
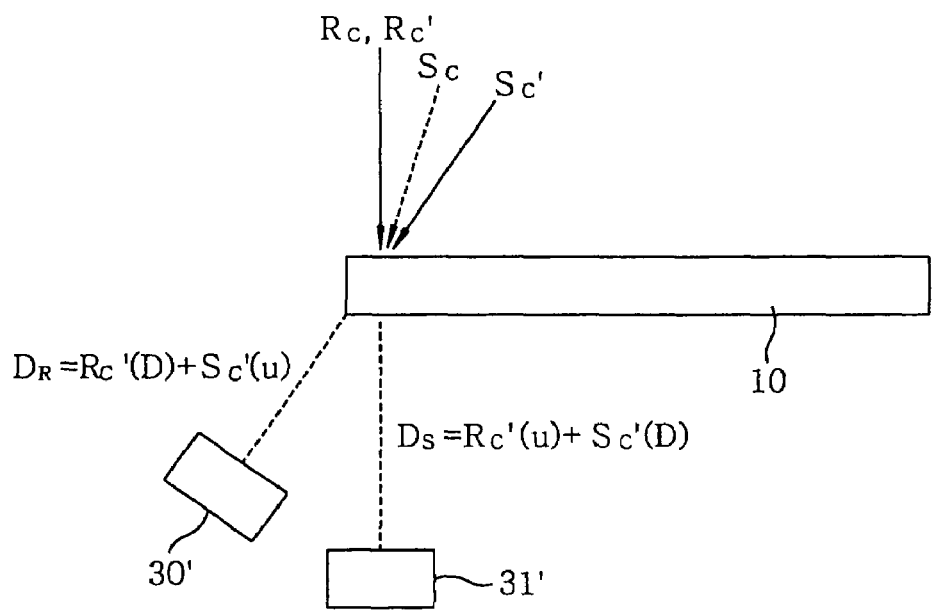
FIG. 7 depicts a schematic view of the HDDS spinner disc apparatus of FIG. 6 for illustrating projection states of wobble detection beams $R_C'$ and $S_C'$.

At the initial stage of reproducing data stored in the spinner disc 10, i.e., before the holographic digital data stored in the data storage section 11 is reproduced, the beam generator 20' projects, as shown in FIG. 7, wobble detection beams $R_C'$ and $S_C'$ to the wobble tracking section 13 in order to detect and then reduce or remove the wobbling which might be incurred while data is being reproduced from the spinner disc 10.

One of the wobble detection beams (e.g., $R_C'$) is projected on the spinner disc 10 along the optical path identical to that of one of the reference and the signal beams (e.g., $R_C$), while the other wobble detection beam (e.g., $S_C'$) is projected on the spinner disc 10 along an optical path deviated from that of the remaining beam (e.g., $S_C$). In other words, the beams $R_C$ and $R_C'$ are basically identical to each other in every aspect (e.g., optical path and characteristics). The wobble detection beam $S_C'$ is also basically identical to the signal beam $S_C$ in terms of the beam characteristics including power, phase, etc. The beams $S_C$ and $S_C'$ are being aimed at an identical merging point but with different incident angles.

The power detectors 30' and 31' are respectively installed at places along the extension of the wobble detection beams $R_C'$ and $S_C'$. When the wobble detection beams $R_C'$ and $S_C'$ are projected to the wobble tracking section 13, the power detector 30' detects a total power $D_R$, which is a sum of the power of a diffracted beam $R_C'$ (D) of the wobble detection beam $R_C'$ and that of an undiffracted beam $S_C'$ (U) of the wobble detection beam $S_C'$, whereas the power detectors 31' detects a total power $D_S$, which represents a sum of the power of a diffracted beam $S_{C'}$ (D) of the wobble detection beam $S_C'$ and that of an undiffracted beam $R_C'$ (U) of the wobble detection beam $R_C'$. The detected powers $D_R$ and $D_S$ is provided to the controller 40'.

The controller 40' compares the detected power levels respectively provided from the power detectors 30' and 31' to estimate the size of wobbling of the spinner disc 10 and, then, controls the tilt adjuster 50 to make the axis of rotation of the spinner disc 10 perpendicular to a writing plane of the spinner disc 10, when necessary. The wobble compensation process will be described hereinbelow.

The powers $D_R$, $D_S$ detected from the power detectors 30' and 31' can be defined as follows:

$$D_R = \alpha' I + (1-\beta')I \qquad \text{Eq. (3); and}$$

$$D_S = (1-\alpha')I + \beta' I \qquad \text{Eq. (4);}$$

therefore, $$D_R - D_S = \alpha' I + (1-\beta')I - (1-\alpha')I - \beta' I = 2(\alpha' - \beta')I \qquad \text{Eq. (5),}$$

wherein diffraction efficiencies "α'" and "β'" are of the wobble detection beams $R_C'$ and $S_C'$, respectively, and "I" is power thereof.

An efficiency difference (α'−β') is calculated from Eq. (5). If the deviation angle between $S_C$ and $S_C'$ is "θ" degrees and the tilt angle of the spinner disc 10 is "a" degrees, the offset angles of the wobble detection beams $R_C'$ and $S_C'$ are "−a" and "θ−a" degrees, respectively. Therefore, the offset angle of $S_C'$ is always greater than that of $R_C'$ by "θ" degrees. Therefore, by knowing the value (α'−β') and the offset angle difference "θ", the actual offset angles of the wobble detection beam $R_C'$ and $S_C'$ can be uniquely determined from the curve in FIG. 5.

Thereafter, the controller 40' controls the tilt adjuster 50 to reduce the tilt angle in an identical manner as in the first embodiment.

Figure 8:
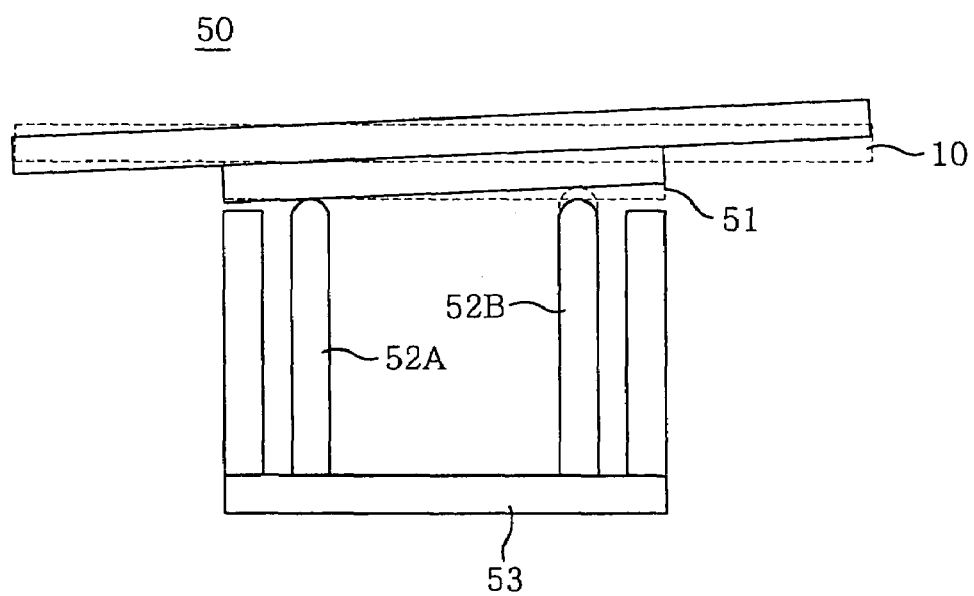
FIG. 8 shows a schematic side view of a tilt adjuster for adjusting a tilt of a disc.

FIG. 8 shows an exemplary schematic side view of the tilt adjuster 50 for adjusting a tilt angle of the spinner disc 10. The tilt adjuster 50 includes an upper plate 51 for loading the spinner disc 10 thereon, a plurality of poles (e.g., four poles but only two poles 52A and 52B are shown in the drawing) and a base 53 on which the poles are installed. A shaft (not shown) for revolving the spinner disc 10 is engaged with the tilt adjuster 50 and is coupled to the spinner disc 10.

An end portion of each of the poles is preferably rounded and is in a direct contact with the upper plate 51. The poles 52A to 52D may be a piezoelectric body and each of their length can be varied by using a piezoelectric effect. If one of the poles 52A to 52D (e.g., 52B) is lengthened as represented as a solid line, the upper plate 51 becomes tilted with a portion in contact with the lengthened pole (e.g., 52B) being raised. Accordingly, when the spinner disc 10 wobbles, the wobbling can be reduced or removed by a fine adjustment of each length of the poles 52A to 52D.

While the invention has been shown and described with respect to the preferred embodiments, it will be understood by those skilled in the art that various changes and modifications may be made without departing from the spirit and scope of the invention as defined in the following claims.

What is claimed is:

1. A holographic digital data storage apparatus for detecting a wobbling in a disc shaped storage medium, the disc including therein one or more holographically generated patterns, the apparatus comprising:

a beam generator for projecting at least two wobble detection beams to the holographically generated patterns, the wobble detection beams having different diffraction efficiencies provided by respective characteristic angles, wherein each characteristic angle is an angle between an optical path of one wobble detection beam and that of its corresponding pattern forming beam used in forming one of the holographically generated patterns and a diffraction efficiency is given by a ratio of a power of a diffracted beam of one of the wobble detection beams to a power of said one of the wobble detection beams; and means for finding at least a difference between the diffraction efficiencies to thereby determine the wobbling in the disc, wherein the number of the holographically generated patterns is one and the number of the wobble detection beams is two.

2. The apparatus of claim 1, wherein the holographically generated pattern is formed by two pattern forming beams, and wherein said corresponding pattern forming beam is one of the two pattern forming beams and an optical path of the other wobble detection beam is identical to that of the other pattern forming beam.

3. The apparatus of claim 1, wherein said detecting means includes:

a first power detector for detecting a sum of a power level of a diffracted beam of a first wobble detection beam and a power level of an undiffracted beam of a second wobble detection beam;

a second power detector for detecting a sum of a power level of an undiffracted beam of the first wobble detection beam and a power level of a diffracted beam of the second wobble detection beam; and means for obtaining a difference between the diffraction efficiencies based on power levels of the wobble detection beams and the detected sums of power levels to thereby determine the wobbling through the use of the characteristic angle and the difference between the diffraction efficiencies.

4. The apparatus of claim 3, wherein the difference between the diffraction efficiencies are calculated as follows:

$D_R = \alpha' I + (1-\beta')I;$ $D_S = (1-\alpha')I + \beta' I;$ and $D_R - D_S = \alpha' I + (1-\beta')I - (1-\alpha')I - \beta' I = 2(\alpha' - \beta')I,$ wherein $D_R$ is a sum of the power level of a diffracted beam of the first wobble detection beam and that of an undiffracted beam of the second wobble detection beam; $D_S$ is a sum of the power level of a diffracted beam of the second wobble detection beam and that of an undiffracted beam of the first wobble detection beam; $\alpha'$ and $\beta'$ are the diffraction efficiencies of the first and the second wobble detection beam, respectively; and I is a power level of the first and the second wobble detection beam.

5. A method for use in a holographic digital data storage system for detecting a wobbling in a disc shaped storage medium, comprising the steps of:

(a) generating one or more holographically generated patterns in the disc through the use of pattern forming beams;

(b) projecting at least two wobble detection beams having different diffraction efficiencies provided at respective characteristic angles, wherein each characteristic angle is an angle between an optical path of one wobble detection beam and that of its corresponding pattern forming beam and a diffraction efficiency is given by a ratio of a power of a diffracted beam of one of the wobble detection beams to that of said one of the wobble detection beams; and (c) finding at least a difference between the diffraction efficiencies to thereby detect the wobble in the disc, wherein the number of the holographically generated patterns is one and the number of the wobble detection beams is two.

6. The method of claim 5, wherein the holographically generated pattern is formed by two pattern forming beams, and wherein said corresponding pattern forming beam is one of the two pattern forming beams used in forming the holographically generated pattern and an optical path of the other wobble detection beam is identical to that of the other pattern forming beam.

7. The method of claim 5, wherein the step (c) includes the steps of:

(c1') detecting a sum of a power level of a diffracted beam of a first wobble detection beam and a power level of an undiffracted beam of a second wobble detection beam;

(c2') detecting a sum of a power level of an undiffracted beam of the first wobble detection beam and a power level of a diffracted beam of the second wobble detection beam;

(c3') obtaining a difference between the diffraction efficiencies based on power levels of the wobble detection beams and the detected sums of power levels; and (c4') determining the wobbling through the use of the characteristic angle and the difference between the diffraction efficiencies.

8. The method of claim 7, wherein the difference between the diffraction efficiencies are calculated as follows:

$$D_R = \alpha'I + (1-\beta')I;$$

$$D_S = (1-\alpha')I + \beta'I; \text{ and}$$

$$D_R - D_S = \alpha'I + (1-\beta')I - (1-\alpha')I - \beta'I = 2(\alpha'-\beta')I,$$

wherein $D_R$ is a sum of the power level of a diffracted beam of the first wobble detection beam and that of an undiffracted beam of the second wobble detection beam; $D_S$ is a sum of the power level of a diffracted beam of the second wobble detection beam and that of an undiffracted beam of the first wobble detection beam; $\alpha'$ and b' are the diffraction efficiencies of the first and the second wobble detection beam, respectively; and I is a power level of the first and the second wobble detection beam.

* * * * *